United States Patent [19]

Vinciguerra et al.

[11] Patent Number: 5,001,831
[45] Date of Patent: Mar. 26, 1991

[54] METHOD FOR FORMING VERY SMALL AXIAL DIMENSION HIGH LOAD-CARRYING CAPACITY ROLLER BEARINGS

[75] Inventors: Costantino Vinciguerra, Florence; Massimo Altamore, Scandicci, both of Italy

[73] Assignee: Nuovopignone-Industrie Meccaniche E Fonderia S.P.A., Florence, Italy

[21] Appl. No.: 375,461

[22] Filed: Jul. 5, 1989

[30] Foreign Application Priority Data

Jul. 13, 1988 [IT] Italy ............................... 21339 A/88

[51] Int. Cl.⁵ ............................................. B21D 53/10
[52] U.S. Cl. .................... 29/898.062; 29/898.065; 29/898.067
[58] Field of Search .................... 29/148.4 A, 149.5 R, 29/437, 453, 509, 510, 511, 513, 898.04, 898.061, 898.062, 898.064, 898.065, 898.067; 384/548

[56] References Cited

U.S. PATENT DOCUMENTS 1,985,693 12/1934 Robinson ..................... 29/148.4 A
2,259,325 10/1941 Robinson ..................... 29/148.4 A
3,533,151 10/1970 Gaudry ......................... 29/148.4 A
4,017,951 4/1977 Aromando ................. 29/148.4 A X

FOREIGN PATENT DOCUMENTS 931409 2/1948 France ........................ 29/148.4 A Primary Examiner—Timothy V. Eley
Attorney, Agent, or Firm—Morgan & Finnegan

[57] ABSTRACT

A method for forming a roller bearing of very small axial dimension and high load-carrying capacity, and applicable also to a large-diameter roller bearing, comprising inserting the rollers into the circumferential guide and rolling track of the outer race and holding the rollers in position by two opposing lateral shoulder-forming spring rings of small thickness which are snap-inserted into corresponding inwardly flared grooves provided in the opposing faces of the bearing outer race. The rings being locked in position by using suitable dies to axially press annular appendices which define the mouth of the annular grooves. Modifications to this method are provided, and the roller bearings obtained in accordance with the invention are described.

6 Claims, 6 Drawing Sheets

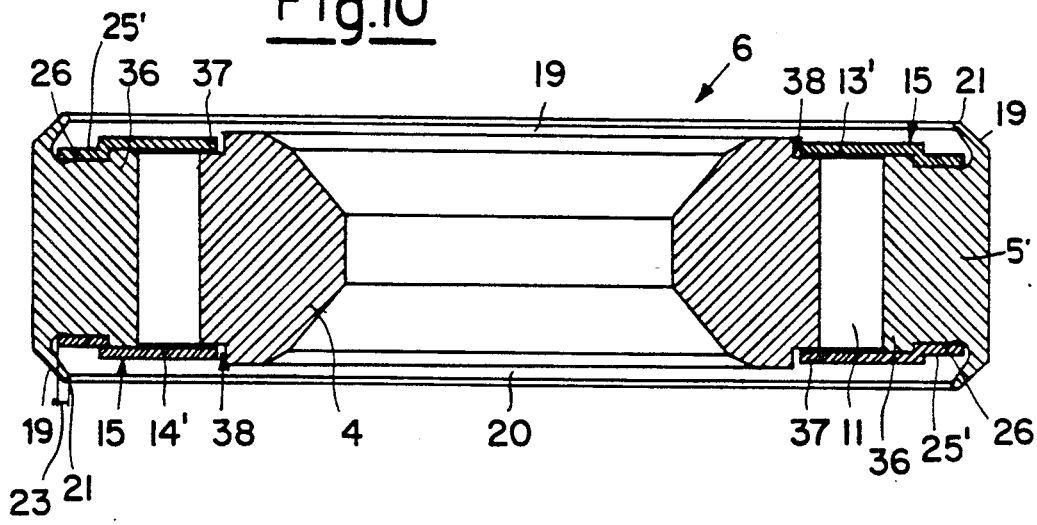
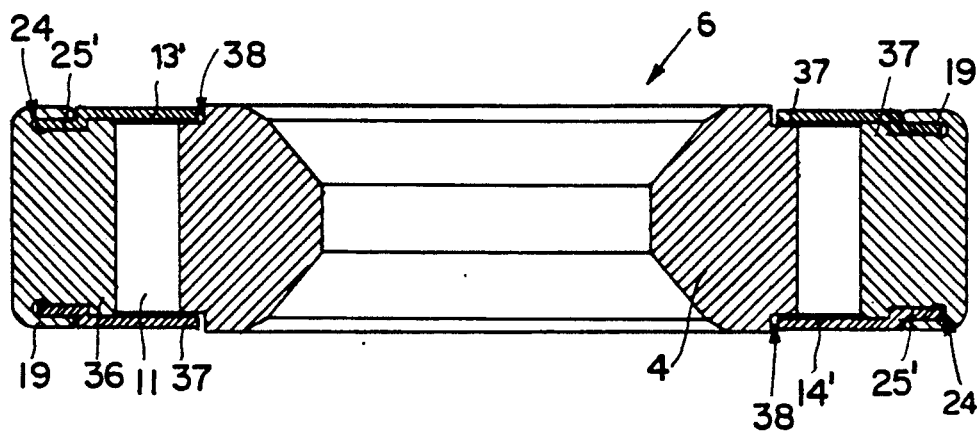

METHOD FOR FORMING VERY SMALL AXIAL DIMENSION HIGH LOAD-CARRYING CAPACITY ROLLER BEARINGS

This invention relates to a method which is very simple, precise and rapid procedure which is perfectly and easily operable and controllable and consequently economical. The present method enables the formation of roller bearings of very small axial dimension, without the need for cages wherein the roller bearings are completely filled with rollers and have a high load-carrying capacity. Such characteristics are specifically required in numerous mechanical fields such as in reciprocating machines and in particular in modern rotary dobbies operating at high speed.

The invention also relates to the roller bearings formed by said method and having the salient characteristic of maximum obtainable load-carrying capacity for a given axial dimension and for given values of the two rolling diameters of the rollers.

In rotary dobbies, the main rotating shaft either transmits or does not transmit motion to the cams of the driving crank arms according to whether a key is either inserted or not inserted into keyways in the shaft, the rods being each hinged via a bearing between the two cheeks of the respective main lever controlling the loom heddle frames.

BACKGROUND OF THE INVENTION

In modern looms, the axial dimension of the heddle frames and of all the lever parts making up said main control levers has been standardized at 12 mm, and because of the considerable reciprocating loads that have to be transmitted the cheeks of the main control levers cannot have a thickness less than about 2.5 mm. Since a certain axial clearance has to be allowed, the axial thickness of said cam-operated crank arms cannot exceed about 6 mm, and consequently the two roller bearings of said crank arms must necessary also have that axial thickness. In the current state of the art, the large-diameter rolling-contact bearing of small axial dimension between the cam and the driving crank arm is formed from balls housed in races provided directly in the cam and crank arm and kept spaced apart by a suitable spacing cage.

Such an arrangement gives rise to a series of drawbacks in its operation, control, construction and assembly.

In this respect, considerable difficulty arises in machining the ball races, which have to be formed with a very close tolerance of some thousandths of mm in large-dimension but small-thickness workpieces and are therefore easily misshaped. These difficulties are aggravated by the fact that the grooves have then to be thermally hardened. The evident problems of controlling defects in said grooves are further supplemented by the laborious operations involved in mounting the balls equidistantly and installing the spacer cage. Finally, but not lastly, it is not possible to completely fill them with balls, as only that number of balls can be mounted which can be inserted between the cam and crank arm when the cam is held with one side in contact with said crank arm, thus limiting the load-carrying capacity of the bearing.

This latter drawback is the most serious considering the increasingly higher speeds used in modern looms. Since the loads to be supported increase with the cube of the speed, this requires the construction of bearings which for a given diameter and a constant fixed axial dimension are able to support a substantially increased load.

SUMMARY OF THE INVENTION

The object of the present invention is to obviate these drawbacks by providing a method for forming a bearing of very small axial dimension which besides being of simple, comfortable and rapid formation and assembly and therefore of low constructional cost, can be effectively and easily controlled.

This is attained substantially by using a roller bearing wherein, instead of balls, rollers are used. Roller bearings have a greater contact surface than the balls and thus a greater capacity for supporting loads. The rollers, in addition, are inserted to provide complete filling with consequent further increase in the load-carrying capacity of the bearing. This is now possible since the rollers are retained in position by two opposing removable spring rings which provide lateral shouldering and which are made as thin as possible and enable rollers of the greatest possible length and consequent greatest load-carrying capacity to be used.

By this means, not only is the use of a spacer cage avoided, the presence of which in the long term is always a possible source of breakage, but there is also the advantage that the roller track now consists of simple cylindrical surfaces which are perfectly accessible and therefore easily machinable and controllable. The the complete filling substantially doubles the number of rollers used compared with the balls used up to the present time, and triples the available contact surface. Practically, this results in bearings with a load-carrying capacity about six times greater than similar bearings of the prior art.

The extreme thinness of said shoulder-forming spring rings together with their large diameter poses the difficult problem of how to lock them in position without deforming them. This problem which according to one basic characteristic of the present invention has been solved by subjecting the outer edge of each ring to exclusively axial forces without any radial component which could deflect the ring. This is attained substantially by forming, by mechanical machining, in the inner edge of the outer bearing race two inwardly flared opposing annular grooves housing said rings, and two corresponding opposing annular channels which between them form two inclined opposing annular appendices of substantially frusto-conical shape projecting to limit the mouth of said grooves to a diameter slightly less than that of said shoulder-forming spring rings. The spring rings have necessarily to be snap-inserted and the appendices are pressed by suitable dies over the flat annular edge of an annular tooth provided at the outer end of the shoulder-forming rings.

The flaring of the annular grooves ensures, by creating a greater space in the radial direction for the respective shoulder-forming ring which is thus free to move, that no radial force is transmitted to the lateral shoulder-forming spring rings. The annular channels also reduce the axial force required to press said inclined opposing annular appendices. This is necessary to prevent deformation of the bearing outer rolling track with consequent no longer perfect sliding. The annular channels also give the annular appendices a shape which, during pressing, facilitates radial displacement of the appendices which is added to the interference in the snap-mounting of the lateral shoulder-forming spring rings to ensure that the shoulder-forming rings cover the flat annular edge of said tooth, with consequent improved resistance to axial forces. After pressing, the annular appendices also act as a radial shoulder for locking the relative spring rings in position in their seat by cooperating, without pressure and hence without transmitting radial forces, with the outer cylindrical wall of said spring rings.

The snap-mounting of the lateral shoulder-forming spring rings in their respective seats has the further advantage of also allowing easy and rapid automatic loading of the rollers into the bearing by a simple apparatus consisting of a rotating toothed wheel, between the teeth of which the rollers disposed with their axis parallel to the axis of rotation of the toothed wheel are inserted by a suitable vertical feeder. On rotating the wheel, the rollers are thus conveyed into a circular channel bounded by a fixed cylindrical surface provided in the body of the apparatus tangential to said toothed wheel and by the actual bearing inner race mounted on a turntable rotating idly on the apparatus body and vertically raisable.

When the track of the bearing inner race has been thus filled with rollers, the bearing outer race into which the upper shoulder-forming spring ring has been already snap-inserted is superposed coaxially on the inner race. On then vertically raising the turntable on which the inner race rests, the two the bearing races are inserted one in the other, and after inverting the assembly and snap-mounting the other shoulder-forming spring ring the frusto-conical annular appendices of the outer race are pressed by a press to rigidly lock the shoulder-forming spring rings.

Thus, the present invention relates to the method for forming a roller bearing of very small axial dimension and high load-carrying capacity. The bearing has an inner race provided with a circumferential guide and rolling track for the rollers and an outer race provided with a cylindrical rolling track for the same rollers and is produced by the following method: forming in the opposing faces of the inner edge of the bearing outer race, by mechanical machining, two inwardly flared opposing annular grooves and two corresponding opposing annular channels so as to form between them two inclined opposing annular appendices of substantially frusto-conical shape projecting to delimit the mouth of the grooves; constructing two lateral small-thickness shoulder-forming spring rings of outer diameter slightly greater than that of the mouth of the grooves and having at their outer end a projecting tooth with a flat annular pressing edge; inserting the rollers into the circumferential guide and rolling track of the bearing inner race by suitable means; snap-inserting one of the lateral shoulder-forming spring rings into one of the annular grooves of the bearing outer race; by suitable means, inserting the inner race, with the rollers inserted in its groove, into the bearing outer race with a lateral shoulder-forming spring ring already snap-inserted; snap-inserting the other lateral shoulder-forming spring ring into the other annular groove of the bearing outer race; and, by means of two opposing dies, axially pressing the two the opposing inclined annular appendices of the bearing outer race over the flat annular pressing edge of the projecting teeth of the lateral shoulder-forming spring rings.

According to a preferred embodiment of the present invention the rollers are inserted into the circumferential guide and rolling track of the bearing inner race until the track is completely full.

According to a further preferred embodiment of the present invention, the opposing dies each comprises an annular appendix which cooperates with the inner edge of the lateral shoulder-forming spring rings. This ensures accurate centering of the spring rings in their respective grooves before they are locked by pressing the frusto-conical annular appendices.

Finally, according to a further preferred embodiment of the present invention the means suitable for inserting the rollers into the circumferential guide and rolling track of the bearing inner race and for inserting the inner race into the bearing outer race with a lateral shoulder-forming spring ring already snap-inserted consist of an apparatus comprising a toothed wheel, between the teeth of which a feeder inserts the rollers, the wheel being rotated tangentially to a circular channel defined by a fixed cylindrical surface provided in the body of the apparatus and by the actual bearing inner race mounted on a turntable rotating idly on the apparatus body and vertically raisable.

According to a modification of the invention the two opposing annular channels which form the outer surface of the frusto-conical opposing annular appendices are not formed mechanically but instead are formed by the pressing operation, by the action of two annular wedges provided on the opposing pressing dies. Such a modification not only results in an obvious reduction in production costs, but also allows a more effective locking of the lateral shoulder-forming spring ring in that a distinctly greater radial displacement of the annular appendices is produced following the action of the annular wedges of the dies, with a resultant increased coverage of the flat annular edge of the teeth of the shoulder-forming spring rings, so that these teeth can now be made more extending in a radial direction.

However, this modification requires a greater pressing force than that required for the main method, so that in some cases the main method is preferable, this being particularly suitable for forming very small dimension roller bearings such as those used in the small end of cam-operated crank arms of rotary dobbies and in other articulated joints of the dobbies.

Because of the small diametrical dimensions, in the case of these latter types of bearing, the lateral shoulder-forming spring rings can be formed with a thickness of the order of one teeth of a millimeter and can therefore be constructed by pressing sheet metal under conditions of considerable work hardening, i.e., producing great hardness. This enables rollers to be used having a length approximately equal to the entire bearing thickness, which must necessarily not exceed 6 mm, allowing bearings to be obtained having a very high load-carrying capacity. On the other hand, in order for the pressing of the frusto-conical appendices of the bearing outer race not to cause said appendices to project beyond the thickness of the bearing, the shoulder-forming rings are shaped with their outer circumferential edge depressed to form the annular flat pressing plane. As a consequence of this, the inwardly flared annular grooves provided in the bearing outer race must have an annular step which can be used for the centering of the lateral shoulder-forming spring rings without having to center by means of the pressing dies. Because of the low peripheral speeds of the rollers due to the small bearing dimensions, the lateral shoulder-forming spring rings can be extended radially to the point of acting as an axial shoulder also for the bearing inner race, thus making it more simple to grind the inner rolling track.

Finally, the roller bearing of very small axial dimension and high load-carrying capacity, comprising an inner race provided with a circumferential guide and rolling track for the rollers and an outer race provided with a cyclindrical rolling track for the same rollers, is characterised according to the present invention in that the rollers are held in position by two small-thickness opposing lateral shoulder-forming spring rings snap-inserted into corresponding inwardly flared annular grooves provided in the opposing faces of the inner edge of the bearing outer race, the rings being locked in position by two opposing inclined annular appendices of substantially frusto-conical shape which are axially pressed over an annular tooth projecting externally from the shoulder-forming spring rings.

The invention is described in detail hereinafter with reference to the accompanying drawings which illustrate preferred embodiments, these embodiments are non-limiting examples only, in that technical or constructional modifications can be made thereto but without leaving the scope of the present invention.

It is however apparent that even though the accompanying drawings relate to the specific application of roller bearings in rotary dobbies, the invention is not limited to that field and can be extended to all fields in which a high load-carrying capacity bearing of very small axial dimension is required.

BRIEF DESCRIPTION OF THE DRAWINGS

FIGS. 10 and 11 show stages in the formation of a modified embodiment of the bearing according to the invention which is particularly suitable for small-diameter bearings;

DETAILED DESCRIPTION OF THE DRAWINGS

Figure 1:
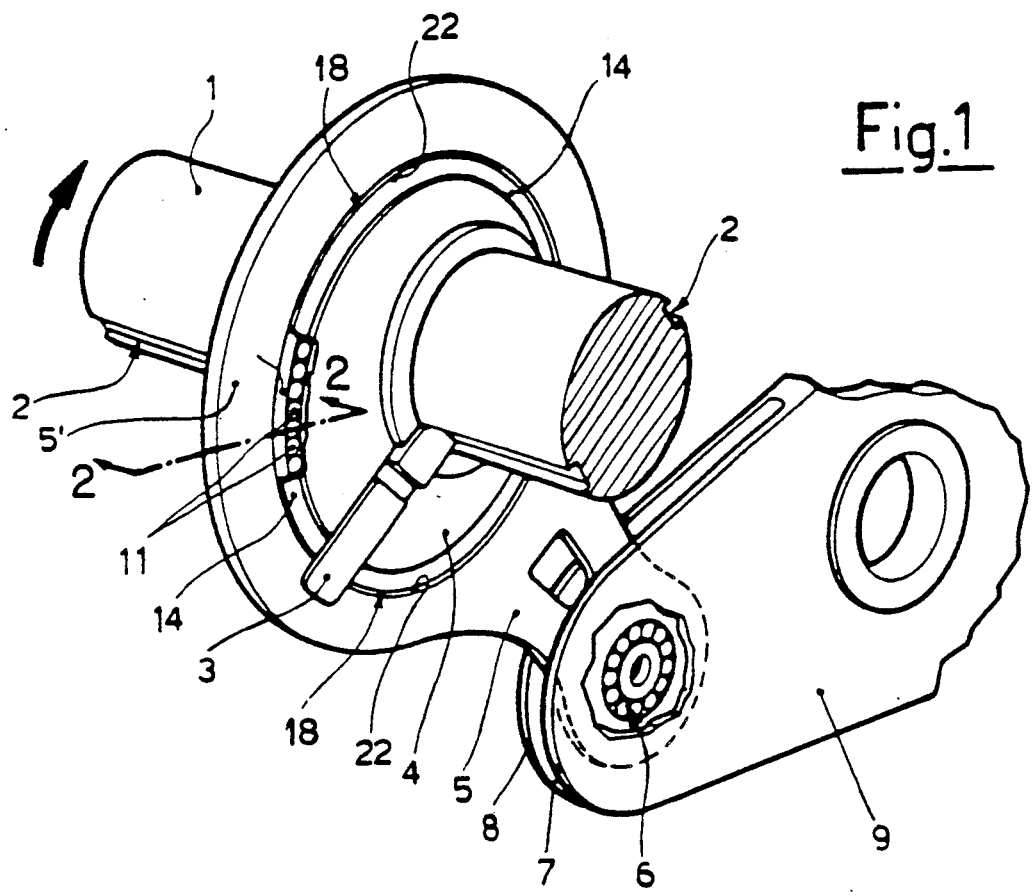
FIG. 1 is a partial perspective view of the linkage between the rotary shaft and the main lever of a rotary dobby, using roller bearings constructed in accordance with the present invention.

With reference to the figures, 1 indicates the main rotating shaft of a rotary dobby, comprising keyways 2 into which a key 3 can be inserted to thus make the shaft rigid with the cam 4 of the dobby driving crank arm 5, the small end of which is pivoted by way of the small-diameter roller bearing 6 between the two cheeks 7 and 8 of the dobby main lever 9. Cam 4 forms the inner race of a preferably completely filled large-diameter roller bearing of axial dimension not exceeding the distance of about 6 mm between the two cheeks 7 and 8, and of which the outer race is formed by the big end 5' of the crank arm 5. The bearing inner race 4 comprises a circumferential guide and rolling track 10 for the rollers 11 while the outer race 5' comprises a cylindrical rolling track 12 for the rollers, which are held in their position by two opposing lateral shoulder-forming spring rings 13 and 14 respectively, of small thickness.

Figure 3:
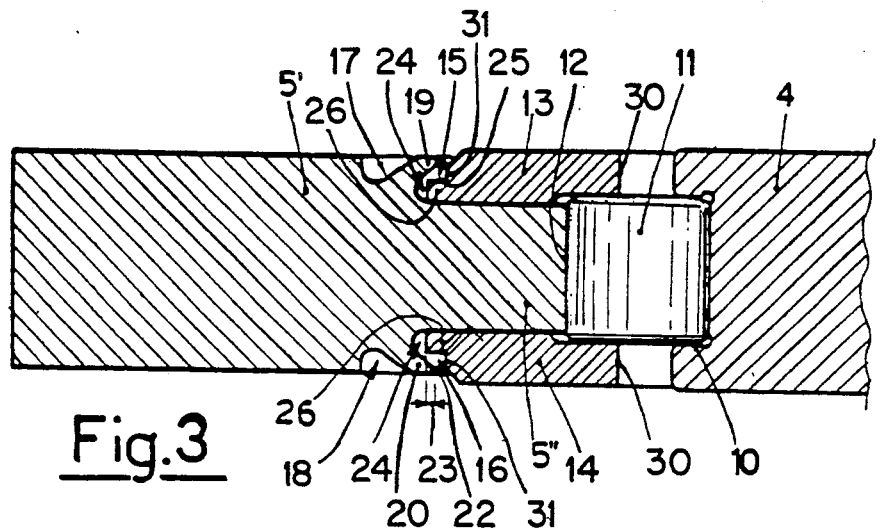
FIGS. 3 and 4 show stages in a method for forming the roller bearing according to the invention.
Figure 5:
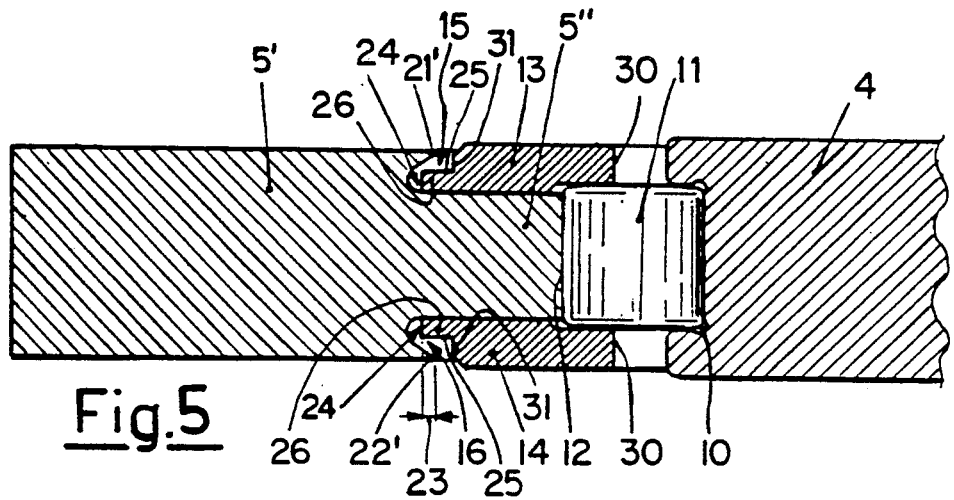
FIGS. 5 to 9 show stages in a method for forming a modified embodiment of the roller bearing according to the invention.
Figure 6:
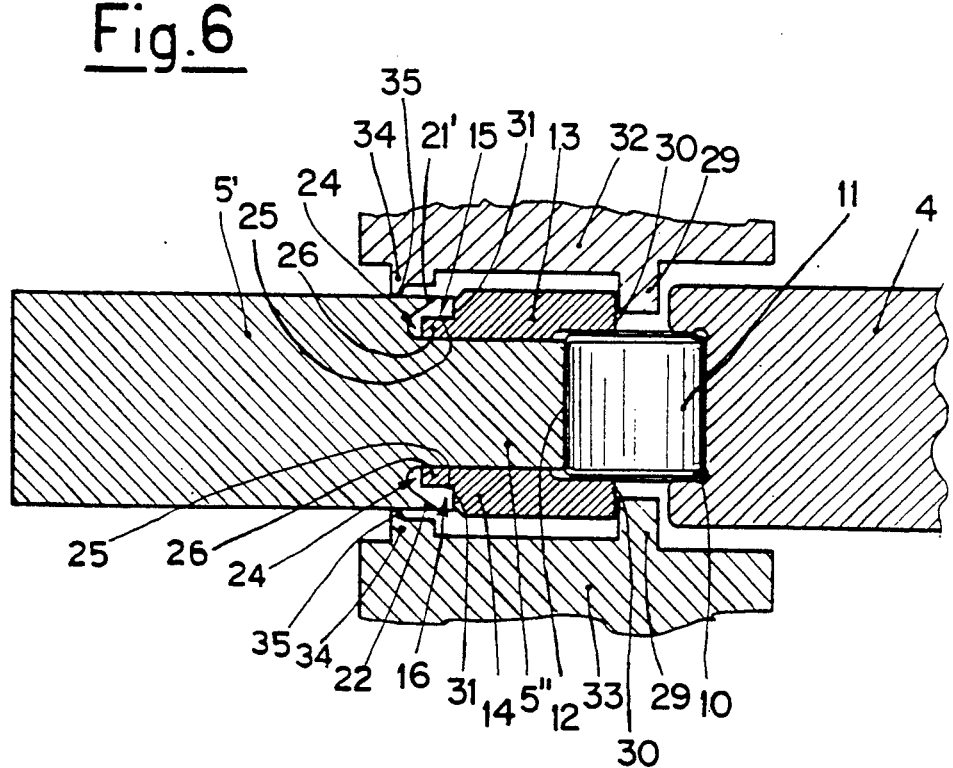
Figure 7:
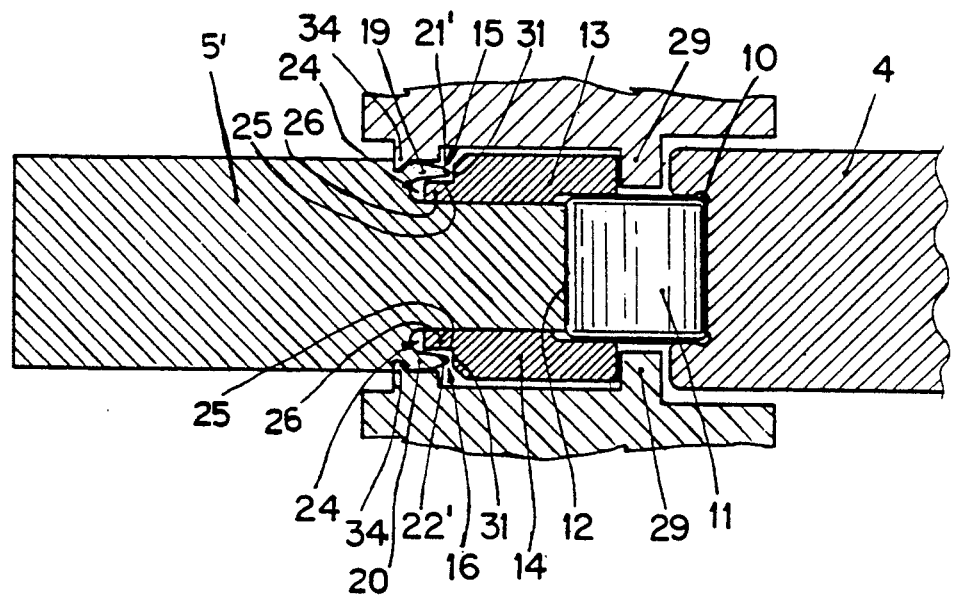
Figure 8:
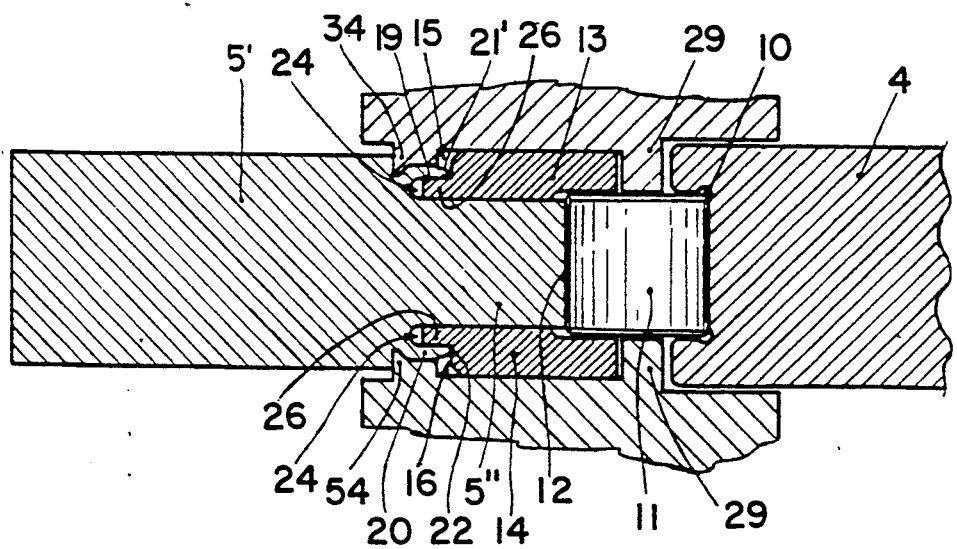
Figure 9:
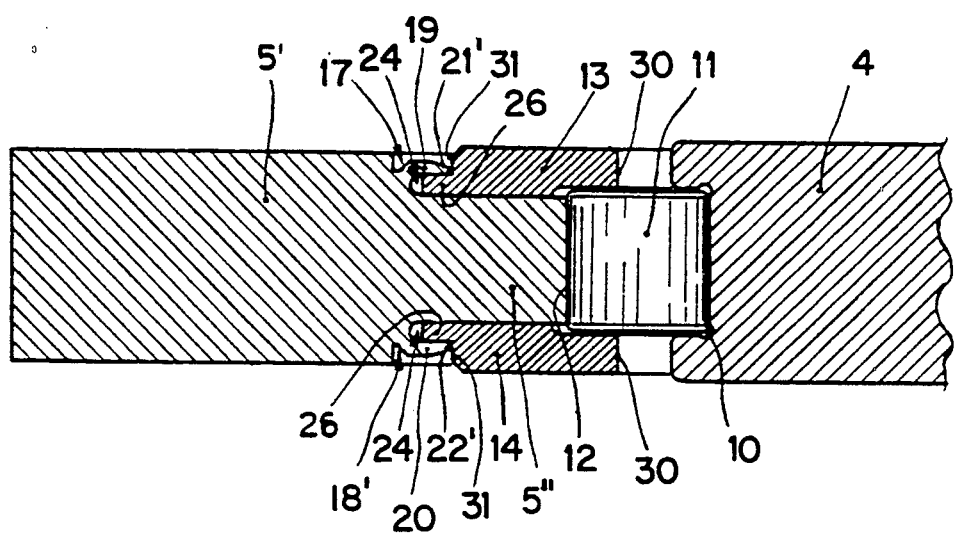

In order to lock the large-diameter small-thickness shoulder-forming spring rings 13 and 14 in position without creating any deformation in them, in the opposing faces of the inner edge 5" of the outer race 5' there are provided by mechanical machining, according to the invention, two annular grooves 15 and 16 respectively (see specifically FIG. 3 or FIG. 5) and two corresponding annular channels 17 and 18 respectively, so as to form two opposing inclined annular appendices 19 and 20 of substantially frusto-conical shape (see FIG. 3) projecting in such a manner that their ends, 21 and 22 respectively, define the opening of said grooves 15 and 16 at a diameter slightly less than the outer diameter of the shoulder-forming rings 13 and 14. In this manner an interference 23 is created between ends 21 and 22 and the corresponding spring rings 13 and 14 (see specifically FIGS. 3, 5 and 10) so that these latter have to be snap-inserted into the annular grooves 15 and 16 and thus, once inserted, remain in position. In addition, said annular grooves 15 and 16 are flared inwards as to create a larger space 24 in a radial direction which, by enabling the spring rings to undergo radial movement, ensures that no radial force is transmitted to them when the annular appendices 19 and 20 are pressed over the flat annular pressing edge 25 (see specifically FIGS. 3, 5 and 10) of a projecting tooth 26 present at the outer circumferential end of shoulder-forming spring rings 13 and 14.

Figure 2:
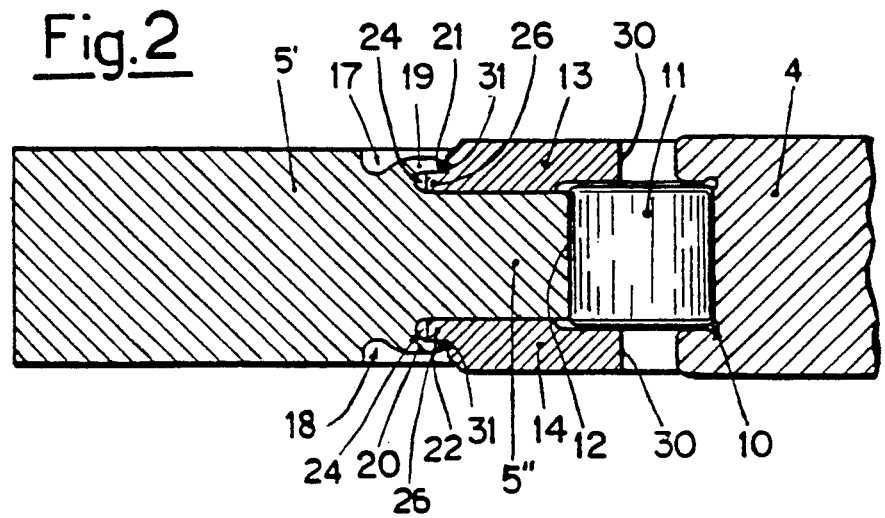
FIG. 2 is a partial cross-section on the line 2—2 of FIG. 1.
Figure 4:
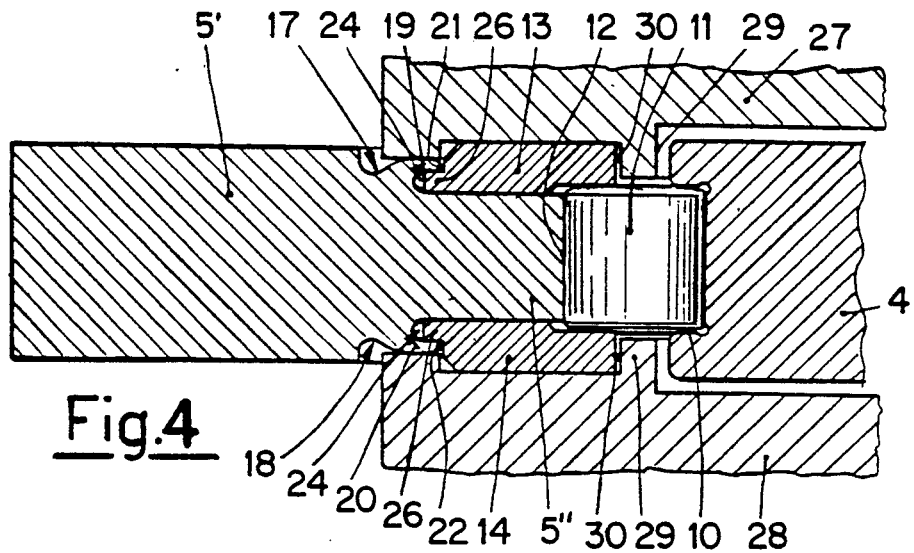

The axial pressing is done by two opposing pressing dies 27 and 28 (see FIG. 4) each comprising an annular appendix 29 cooperating with the inner edge 30 of the shoulder-forming spring rings 13 and 14 to keep these latter perfectly centered in the respective inwardly flared annular grooves. By means of said pressing, given the inclined shape of the annular appendices 19 and 20, these latter also undergo a radial displacement which, added to the snap-mounting interference 23, ensures a more extensive coverage of annular edge 25 and more effective locking, without radial force transmission as the ends 21 and 22 of the annular appendices 19 and 20 cooperate (see FIG. 2) with the outer cylindrical wall 31 of said spring rings 13 and 14 without interference.

According to a further embodiment of the invention shown in FIGS. 5 to 9, the opposing annular channels 17 and 18 are not formed mechanically in the bearing outer race 5, but instead the outer edges or ends 21' and 22' of the inwardly flared opposing annular grooves 15 and 16 are pressed axially with two opposing pressing dies 32 and 33 (see FIG. 6) which in addition to said annular appendix 29 each also comprise an annular wedge 34 having its inclined face 35 facing the interior of the bearing. In this manner the action of annular wedges 34 being driven into the bearing outer race 5' (see FIGS. 7 and 8) creates the opposing annular channels 17' and 18' which generate opposing inclined appendices 19 and 20 which are to be pressed axially by dies 32 and 33. Again, the action of the inclined surfaces 35 of annular wedges 34 produces a distinctly greater radial displacement of appendices 19 and 20, with consequent still more effective locking of the spring rings 13 and 14. In the case of roller bearings with both small diametrical and axial dimensions, such as the bearing 6 as in FIGS. 10 and 11 used to pivotally mount the small end of the driving crank arm 5 between the two cheeks 7 and 8 of the rotary dobby main lever 9, in which the shoulder-forming spring ring 13' and 14' respectively can be formed with a thickness of the order of a tenth of a millimeter and therefore be constructed by pressing sheet metal under very strong work hardening conditions with consequent great hardness, the method of the invention shown in FIGS. 10 and 11 can be used.

According to this method, the opposing lateral shoulder-forming spring rings 13' and 14' for the rollers 11 are shaped by stamping, with their outer circumferential edges 25' depressed to form said annular flat pressing edges on which the corresponding inclined annular appendices 19 and 20 are axially pressed. Correspondingly the inwardly flared annular grooves, 15 and 16 respectively, comprise an annular step 36 which cooperates with depressed edges 25' for centering the spring rings 13' and 14', which themselves also act as a lateral shoulder for the bearing inner race 4, their inner edge 37 extending radially over corresponding annular grooves 38 provided in the opposing outer edges of the inner race 4.

Figure 12:
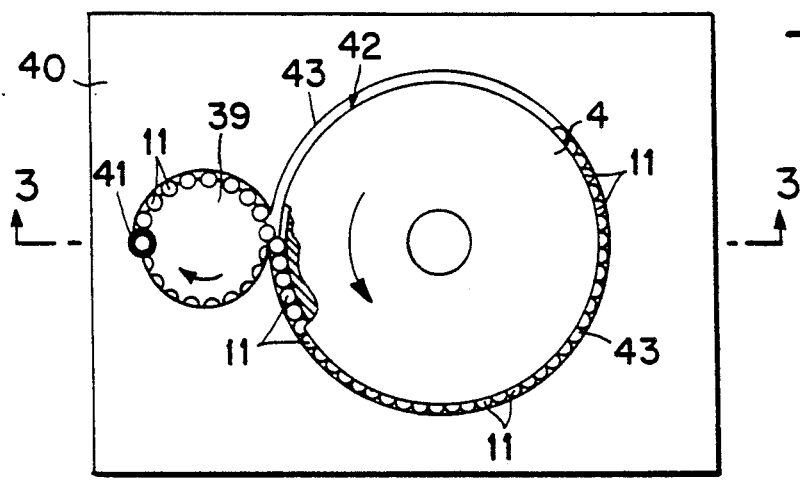
FIG. 12 is a plan view of the means for inserting the rollers into the inner race and for inserting the inner race into the bearing outer race, according to the invention.
Figure 13:
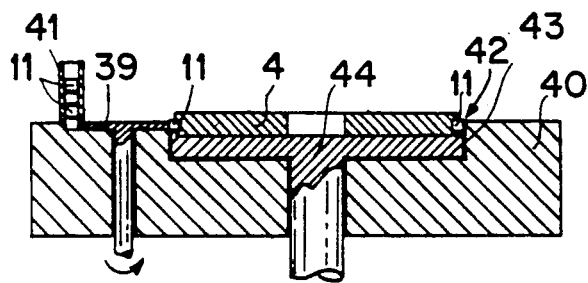
FIG. 13 is a section on the line 3—3 of FIG. 12.
Figure 14:
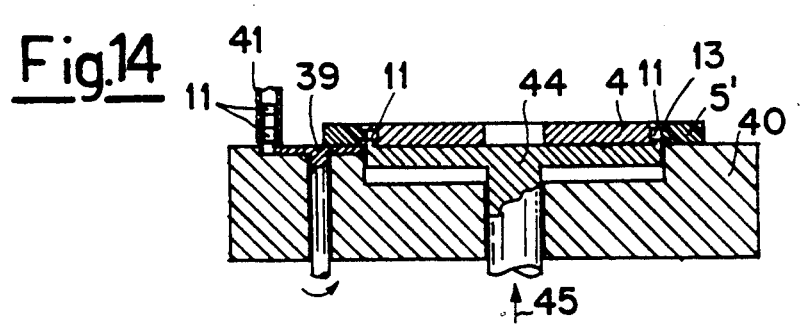
FIG. 14 shows the stage in which the inner race is inserted into the bearing outer race, according to the invention.

Finally, FIGS. 12 to 14 show the apparatus according to the invention for facilitating the assembly of the rollers in the bearing.

The apparatus consists essentially of a toothed wheel 39 rotatably supported by a base 40. A feeder 41 inserts the rollers 11 between the teeth of toothed wheel 39, which is rotated tangentially to a circular channel 42 defined by a cylindrical surface 43 (see FIG. 12) provided in the base 40 and by the bearing inner race 4 itself, which is mounted on a turntable 44 (see FIG. 13) rotating idly on the base 40 and vertically raisable (see FIG. 14) by a force 45, to insert the inner race 4, with the rollers mounted, into the bearing outer race 5' into which a shoulder-forming spring ring 13 has been previously snap-inserted.

We claim:

1. A method for forming a roller bearing of very small axial dimension and high load-carrying capacity, said roller bearing comprising an inner race provided with a circumferential guide and rolling track for rollers and an outer race provided with a cylindrical rolling track for the same rollers, the method comprising the steps of: forming in opposing faces of an inner edge of the bearing outer race, two inwardly flared opposing annular grooves and two corresponding opposing annular channels so as to form between them two inclined opposing annular appendices of substantially frustoconical shape projecting to define a mouth of said grooves; constructing two small-thickness lateral shoulder-forming spring rings of outer diameter slightly greater than that of the mouth of the grooves and having at their outer circumferential end a projecting tooth with a flat annular pressing edge; inserting rollers into in lieu thereof circumferential guide and rolling track of the bearing inner race; snap-inserting one of the lateral shoulder-forming spring rings into one of the annular grooves of the bearing outer race; inserting the inner race with rollers inserted in its circumferential guide and rolling track into the bearing outer race with the lateral shoulder-forming spring ring already snap-inserted; snap-inserting the other lateral shoulder-forming spring ring into the other annular groove of the bearing outer race; and, by means of two opposing dies, axially pressing the two opposing inclined annular appendices of the bearing outer race over the flat annular pressing edge of the projecting teeth of said lateral shoulder-forming spring rings.

2. A method for forming a roller bearing of very small axial dimension and high load-carrying capacity, a roller bearing comprising an inner race provided with a circumferential guide and rolling track for rollers and an outer race provided with a cylindrical rolling track for the same rollers, the method comprising the steps of: forming in opposing faces of an inner edge of the bearing outer race, two inwardly flared opposing annular grooves; constructing two small-thickness lateral shoulder-forming spring rings of outer diameter slightly greater than that of a mouth of the grooves and having at their outer circumferential end a projecting tooth with a flat annular pressing edge; inserting rollers into the circumferential guide and rolling track of the bearing inner race; snap-inserting one of the lateral shoulder-forming spring rings into one of the annular grooves of the bearing outer race; inserting the inner race, with the rollers inserted in its circumferential guide and rolling track into said bearing outer race with a lateral shoulder-forming spring ring already snap-inserted; snap-inserting the other lateral shoulder-forming spring ring into the other annular groove of the bearing outer race; and axially pressing the outer edge of the inwardly flared annular grooves of the bearing outer race over the flat annular pressing edge of the projecting teeth of the lateral shoulder-forming spring rings by means of two opposing pressing dies each pressing die comprising an annular wedge arranged to act in proximity to an outer edge of the annular grooves, an inclined face of the wedge facing towards the interior of the bearing.

3. A method for forming roller bearings as claimed in claim 1 or 2, wherein the rollers are inserted into the circumferential guide and rolling track of the bearing inner race until the track is completely full.

4. A method for forming roller bearings as claimed in claim 1 or 2, wherein the opposing dies each comprise an annular appendix which cooperates with the inner edge of the lateral shoulder-forming spring rings.

5. A method for forming roller bearings as claimed in claim 1 or 2, wherein the inserting of the rollers into the circumferential guide and rolling track of said bearing inner race and the inserting of the inner race complete with rollers into the bearing outer race with a lateral shoulder-forming spring ring already snap-inserted is carried out by means of an apparatus comprising a toothed wheel, between teeth of which a feeder inserts rollers, the wheel being rotated tangentially to a circular channel defined by a fixed cylindrical surface provided in the apparatus and by the actual bearing inner race mounted on a turntable which is rotating idly on the apparatus body and which is vertically raisable.

6. A method for forming roller bearings as in claims 1 or 2, wherein the two inwardly flared opposing annular grooves in opposing faces of an inner edge of the bearing outer race are formed by mechanical machining.

* * * * *